(12) United States Patent
Koch et al.

(10) Patent No.: US 11,028,595 B2
(45) Date of Patent: Jun. 8, 2021

(54) SYSTEMS AND METHODS FOR ATTACHING FABRIC PANELS TO STRUCTURES

(71) Applicant: Engineering Services and Products Company, South Windsor, CT (US)

(72) Inventors: Kevin S. Koch, Dubuque, IA (US); Larry J. Hermsen, Dyersville, IA (US); Samuel J. Manternach, Worthington, IA (US); Eugenio Farach, Clinton, IA (US); Robert C. Blush, Worthington, IA (US); Collin C. Clark, Dubuque, IA (US)

(73) Assignee: ENGINEERING SERVICES AND PRODUCTS COMPANY, South Windsor, CT (US)

( * ) Notice: Subject to any disclaimer, the term of this patent is extended or adjusted under 35 U.S.C. 154(b) by 0 days.

(21) Appl. No.: 16/456,840

(22) Filed: Jun. 28, 2019

(65) Prior Publication Data
US 2020/0002952 A1 Jan. 2, 2020

Related U.S. Application Data

(60) Provisional application No. 62/691,824, filed on Jun. 29, 2018.

(51) Int. Cl.
*E04F 13/00* (2006.01)
*E04F 13/076* (2006.01)
(Continued)

(52) U.S. Cl.
CPC ............ *E04F 13/005* (2013.01); *E04B 9/303* (2013.01); *E04F 10/0633* (2013.01); *E04F 13/076* (2013.01); *E04H 15/642* (2013.01)

(58) Field of Classification Search
CPC ....... E04B 9/303; E04B 9/306; E04H 15/644; E04H 15/322; E04H 15/642; E04F 10/0633; E04F 10/02; E04F 13/005; E04F 13/076
See application file for complete search history.

(56) References Cited

U.S. PATENT DOCUMENTS

| | | | | |
|---|---|---|---|---|
| 2,787,321 A | * | 4/1957 | Dietz | ...................... E04F 10/02 160/47 |
| 4,571,897 A | * | 2/1986 | Kerr | ......................... E04D 3/28 52/13 |

(Continued)

*Primary Examiner* — Andrew J Triggs
(74) *Attorney, Agent, or Firm* — Perkins Coie LLP

(57) ABSTRACT

A fabric panel attaching system and methods of assembly and use are presented for attaching fabric panels to structural elements, such as building frames. In various embodiments, the fabric panel attachment system includes a keder rail fastened to support bar, which is attached to a structural profile, such as a building frame member. In some embodiments, the keder rail is fastened to a support bar with bolt and nut. One or more fabric panels are installed within channels of the keder rail. An alignment element may be used with a fastener to assist in aligning abutting sections of keder rail. In various embodiments, the fabric panel attachment system is secured to flat or curvilinear faces of the structural elements. In some embodiments, the fabric panel attachment system may secure directly to the structural element and not a support bar.

13 Claims, 3 Drawing Sheets

(51) Int. Cl.
*E04F 10/06* (2006.01)
*E04H 15/64* (2006.01)
*E04B 9/30* (2006.01)

(56) References Cited

U.S. PATENT DOCUMENTS

| | | | | |
|---|---|---|---|---|
| 7,065,934 B2* | 6/2006 | Allin | ................... | E04F 10/0633 |
| | | | | 160/38 |
| 9,038,349 B2* | 5/2015 | Fox | ....................... | E04H 15/322 |
| | | | | 52/712 |
| 9,334,653 B2* | 5/2016 | Fox | ..................... | E04F 10/0633 |
| 10,174,507 B1* | 1/2019 | Henbid | ................ | A01G 9/1407 |
| 10,273,709 B2* | 4/2019 | Fox | ......................... | E04B 9/306 |
| 2015/0020473 A1* | 1/2015 | Fox | ......................... | E04B 9/303 |
| | | | | 52/712 |
| 2015/0252567 A1* | 9/2015 | Fox | ......................... | E04D 5/146 |
| | | | | 52/712 |
| 2016/0230391 A1* | 8/2016 | Fox | ......................... | E04B 9/306 |
| 2020/0002952 A1* | 1/2020 | Koch | .................... | E04H 15/644 |

\* cited by examiner

SYSTEMS AND METHODS FOR ATTACHING FABRIC PANELS TO STRUCTURES

CROSS-REFERENCE TO RELATED APPLICATIONS

The present application is a non-provisional of U.S. Provisional Patent Application Ser. No. 62/691,824, titled "Systems and Methods for Attaching Fabric Panels to Structures", filed Jun. 29, 2018, which is incorporated herein as if set out in full.

BACKGROUND

Fabric covered buildings are used in many commercial settings, from agriculture to industry, due to their ease of assembly, low cost, and ability to be relocated. The basic configuration for fabric covered buildings includes a series of transverse frame members, connected with one another by purlins, and covered with a taut fabric cover.

Assembly of some fabric covered buildings begins with securing building frame members together and raising them into an assembly position. The fabric cover is then secured in sections across the building frame. A fabric panel is first placed on the building frame. One side of the fabric panel is secured to a length of building frame. The panel is then stretched into a taut position, where the opposite side may be secured to another length of building frame. This process continues, fabric panel by fabric panel, until the building is covered, as desired. Optionally, the fabric panels may be individually secured, at their opposite sides, to mounting tracks, such as keder rails, associated with opposing lengths of building frame. The fabric panels are then pulled, individually, along the mounting tracks from one side of the building frame to the other.

Where multiple fabric panels are used to cover the building, it can be difficult and time consuming for a crew of workers to secure the fabric panels so that they are taut when secured. The building frame, once erected, may be rigid. Accordingly, the crew must labor to either constantly stretch the fabric panels taut while securing them in position or attempt to pull lengths of taut fabric panels across the building frame. Frequently, the fabric covered building is configured with mounting tracks temporarily positioned closer than their final installed position, so panels can be pulled through the tracks while in a slack state. Tracks are then positioned to their final installed positions to properly tension the fabric using a variety of means. The labor expended in this step can be costly. Accordingly, a new system and method of attaching fabric panels to building frames is desired that is faster and easier to assemble, without sacrificing the quality of the final product.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides various embodiments of a fabric panel attaching system and methods of assembly for attaching fabric panels to structures such as building frames. In various embodiments, the fabric panel attachment system includes a keder rail coupled with a structural profile. The keder rail includes a mounting arm that extends outwardly from a lower end portion or bottom surface of the keder rail and is fastened to a support, which is associated with the structural profile. In embodiments of the present technology, the mounting arm of the keder rail is fastened to support with a bolt and a nut. In various embodiments, the fabric panels being secured with the attaching system are keder fabric panels.

In at least one method of use, the keder rail is in a starting position when the mounting arm is positioned in a spaced-apart relationship with support. A spacer is optionally provided to extend between the mounting arm and the support and further support keder rail by opposing a force exerted between bolt and nut. The spacer can be removed after the initial installation of first fabric panel in a slackened state after loosening the bolt and nut. The first fabric panel is installed into the keder rail by interfacing a first fabric panel keder bead of first fabric panel with a first keder channel. In some embodiments, the keder rail includes another elongated, open alignment channel into which an alignment element may be installed to align abutting sections of keder rail. In many embodiments, the position of the keder rail is situated prior to installation of first fabric panel.

The first fabric panel may be tensioned by turning the bolt within the nut until the mounting arm and the support are positioned against, or in close proximity with, one another. In some embodiments, a distal end portion of the mounting arm is chamfered to provide a space between the mounting arm and the support to accommodate a weld bead or debris that may be located between the mounting arm and the support. In particular embodiments, the nut is prevented from rotating by interacting with depressed channel in the keder rail.

Embodiments of the present technology may be secured to a rounded surface of a structural element. In other embodiments, the fabric attachment system may be secured to a square sectional element without a support extending from the structural profile. In such embodiments, a mounting arm extends from the keder rail and attaches to the structural profile directly, without a support structure 16 as was presented in previous embodiments of the fabric panel attachment system.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-6, various embodiments of a fabric panel attaching system 10 and methods of assembly and use are presented for attaching fabric panels to structures such as building frames. It is contemplated that embodiments of the fabric panel attachment system of the present technology will be sufficiently versatile to be used with a wide variety of different building frames. Accordingly, the depicted and described building frame members are not to be taken in a limiting sense and are generally described herein as structural profiles to which the fabric panel attachment system 10 may be attached and supported. The fabric panels depicted and described herein may include one of various keder-style fabric panels but may include a wide array of variations known in the industry. Similarly, exemplary mounting tracks, such as the depicted keder rails, are described herein for use with the fabric panel attachment system 10. However, aspects of the keder rail design may be altered without departing from the scope of the present technology.

Figure 1:
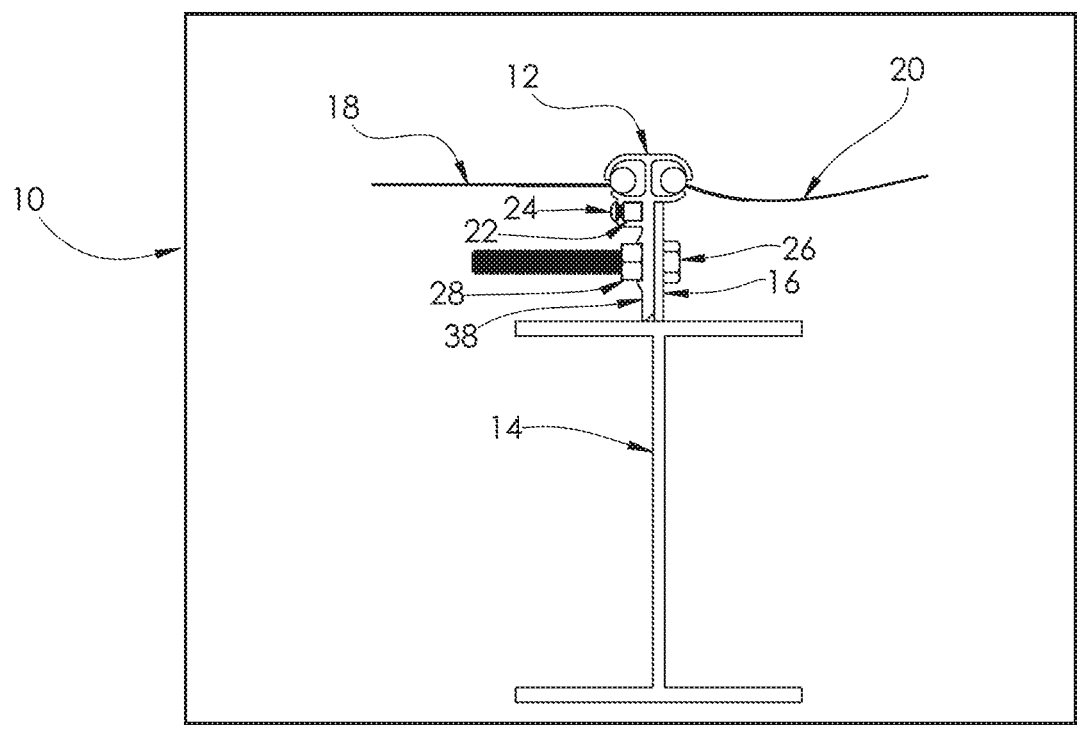
FIG. 1 depicts a section view of one embodiment of the fabric attachment system of the present technology with a keder rail in a final position with one of two fabric members in a tensioned position.

With reference to FIG. 1, discrete components of the fabric panel attachment system 10 are depicted in an exemplary embodiment. In the depicted embodiment, the fabric panel attachment system 10 includes a keder rail 12 operatively coupled with a structural profile 14. In various embodiments, the keder rail 12 includes a mounting arm 38 that extends outwardly from a lower end portion or bottom surface of the keder rail 12 and is fastened to a support 16, which is associated with the structural profile 14. In particular embodiments, the mounting arm 38 of the keder rail 12 is fastened to support 16 with bolt 26 and nut 28. In the depicted embodiment, a first fabric panel 18 and a second fabric panel 20 are installed within opposing channels of the keder rail 12. In various embodiments, the first fabric panel 18 and second fabric panel 20 are keder fabric panels. In particular embodiments, an alignment element 22 is used in conjunction with fastener 24 to assist in aligning abutting sections of keder rail 12.

Figure 2:
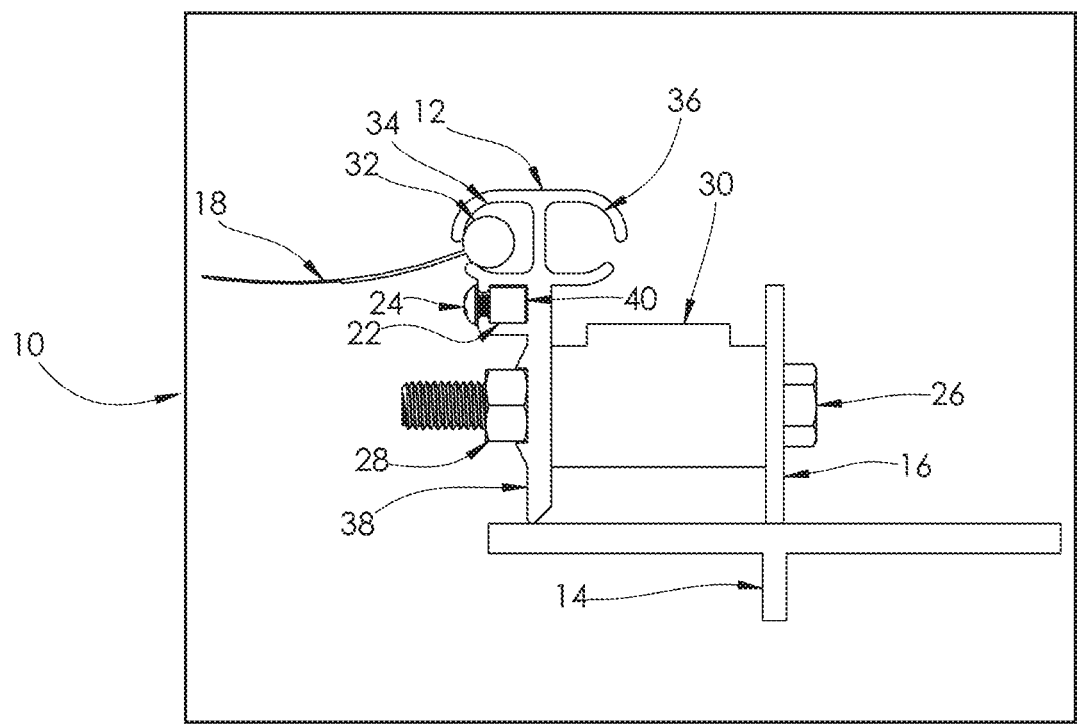
FIG. 2 depicts a cropped section view of the fabric attachment system of FIG. 1 with the keder rail in a starting position with a first fabric member installed in a slack position.

With reference to FIG. 2, an embodiment of the fabric panel attachment system 10 is depicted with the keder rail 12 in a starting position with the first fabric panel 18 disposed in a slack position. Structural profile 14 is partially cropped in this view to focus on other elements of the present technology. Keder rail 12 is shown in a starting position, wherein the mounting arm 38 is positioned in a spaced-apart relationship with support 16. Spacer 30 is optionally provided to extend between the mounting arm 38 and the support 16 and further support keder rail 12 by opposing a force exerted between bolt 26 and nut 28. Spacer 30 is depicted as a single piece of formed sheet metal part with a largely "C" shaped profile for illustrative purposes but could take the form of various shapes or styles to achieve the intended function; such alternates are contemplated herein. Spacer 30 can be removed after the initial installation of first fabric panel 18 in a slackened state after loosening bolt 26 and nut 28. As depicted, the first fabric panel 18 has been installed into keder rail 12 by interfacing a first fabric panel keder bead 32 of first fabric panel 18 with a first keder channel 34, which is an elongated, open channel. A second keder channel 36 can be seen on the opposing side without a fabric panel currently installed. While the exemplary keder rail 12 is depicted as having both a first keder channel 34 and a second keder channel 36, it is contemplated that the keder rail may have one or more keder channels, depending on the desired application. In the depicted embodiment, the keder rail 12 includes another elongated, open alignment channel 40 into which alignment element 22 may be installed to align abutting sections of keder rail 12. Alignment element 22 is shown here as a square profile member and may, in practice, be much shorter in length than sections of keder rail 12 while still serving its intended purpose. In this embodiment, fastener 24 locks alignment element 22 in position in a first one of two adjoining sections of keder rail 12 by functioning as a set screw. The position of keder rail 12 is situated, as illustrated in FIG. 2, prior to installation of first fabric panel 18.

Figure 3:
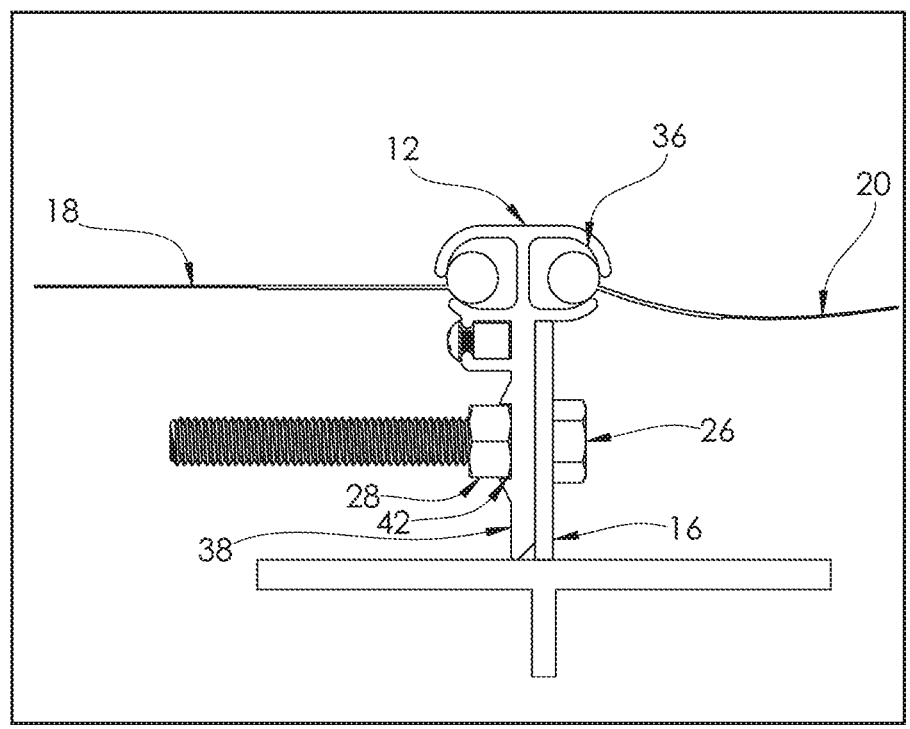
FIG. 3 depicts a cropped section view of the fabric attachment system of FIG. 2 with the keder rails in a final position with one of two fabric members tensioned.

With reference to FIG. 3, the keder rail 12 is depicted after the spacer 30, shown in FIG. 2, has been removed. FIG. 3 provides an exemplary view of a final position with the first fabric panel 18 in a tensioned position. First fabric panel 18 is tensioned by turning bolt 26 within nut 28 until the mounting arm 38 and the support 16 are positioned against, or in close proximity with, one another. In some embodiments, a distal end portion of the mounting arm 38 is chamfered to provide a space between the mounting arm 38 and the support 16. This space may be shaped to accommodate a weld bead or debris that may be located between the mounting arm 38 and the support 16. In particular embodiments, nut 28 is prevented from rotating by interacting with depressed channel 42 in keder rail 12 which is, therefore, drawn to the right until fully fastened in the final position. With reference to FIG. 3, the second fabric panel 20 is depicted in an initial installed position within second keder channel 36, in a slack condition.

Figure 4:
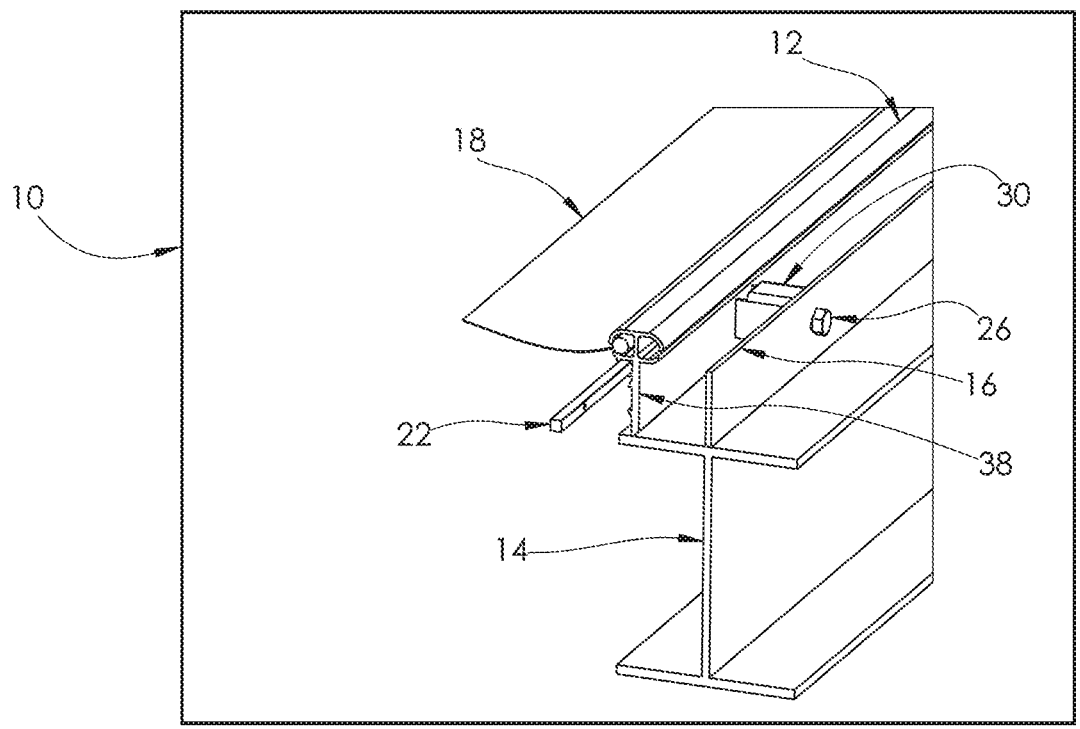
FIG. 4 depicts a cropped isometric view of the fabric attachment system of FIG. 2 and depicts the keder rail in a starting position with a first fabric member installed in a slack position.

With reference to FIG. 4, an embodiment of the fabric panel attachment system 10 is depicted in a cropped isometric view of the same assembly and state detailed in FIG. 2 with the keder rail in a starting position with a first fabric member installed in a slack position. Keder rail 12 is in a starting position with the first fabric panel 18 disposed in a slack position. In the starting position, the mounting arm 38 of keder rail 12 is positioned in a spaced-apart relationship with support 16; support 16 being fixed to structural profile 14. Spacer 30 is optionally provided to extend between the mounting arm 38 and the support 16 and further support keder rail 12 by opposing a force exerted by bolt 26. Spacer 30 is depicted as a single piece of formed sheet metal part with a largely "C" shaped profile for illustrative purposes but could take the form of various shapes or styles to achieve the intended function; such alternates are contemplated herein.

Spacer 30 can be removed after the initial installation of first fabric panel 18 in a slackened state after loosening bolt 26. As depicted, the first fabric panel 18 has been installed into keder rail 12. In the depicted embodiment, alignment element 22 may be installed to align abutting sections of keder rail 12. Alignment element 22 is shown here as a square profile member and may, in practice, be much shorter in length than sections of keder rail 12 while still serving its intended purpose. The position of keder rail 12 is situated, as illustrated in FIG. 4, prior to installation of first fabric panel 18.

Figure 5:
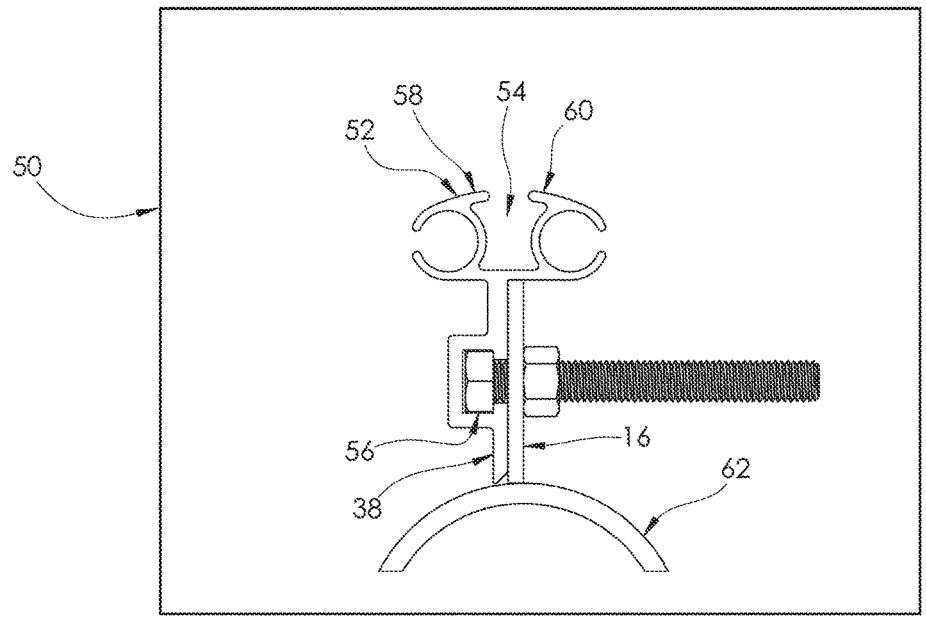
FIG. 5 depicts a cropped section view of another embodiment of the fabric attachment system of the present technology as it may be applied to a rounded structural element.

With reference to FIG. 5, another embodiment of the fabric panel attachment system of the present technology is depicted in a manner where it is secured to a rounded surface of a structural element 62. In the depicted embodiment, the fabric panel attachment system 50 includes a keder rail 52 containing an elongated channel 54, which may be used to receive portions of fabric flaps that extend from the fabric panels (not depicted). First hook protrusion 58 and second hook protrusion 60 provide retention features that engage one or more mechanical plugs, beads, or other fastening structures that secure the flaps within the elongated channel. Furthermore, keder rail 52 includes a fastening channel 56 within the mounting arm 38, with which various hardware types, such as the depicted bolt or other fastener, engage. In various embodiments, support 16 is attached to a different structural profile 62 illustrated as a round tube, partially cropped to enlarge pertinent details of the figure. While fabric panels and states of staging versus final position are not illustrated here, those concepts and progressions previously discussed similarly apply to this embodiment.

Figure 6:
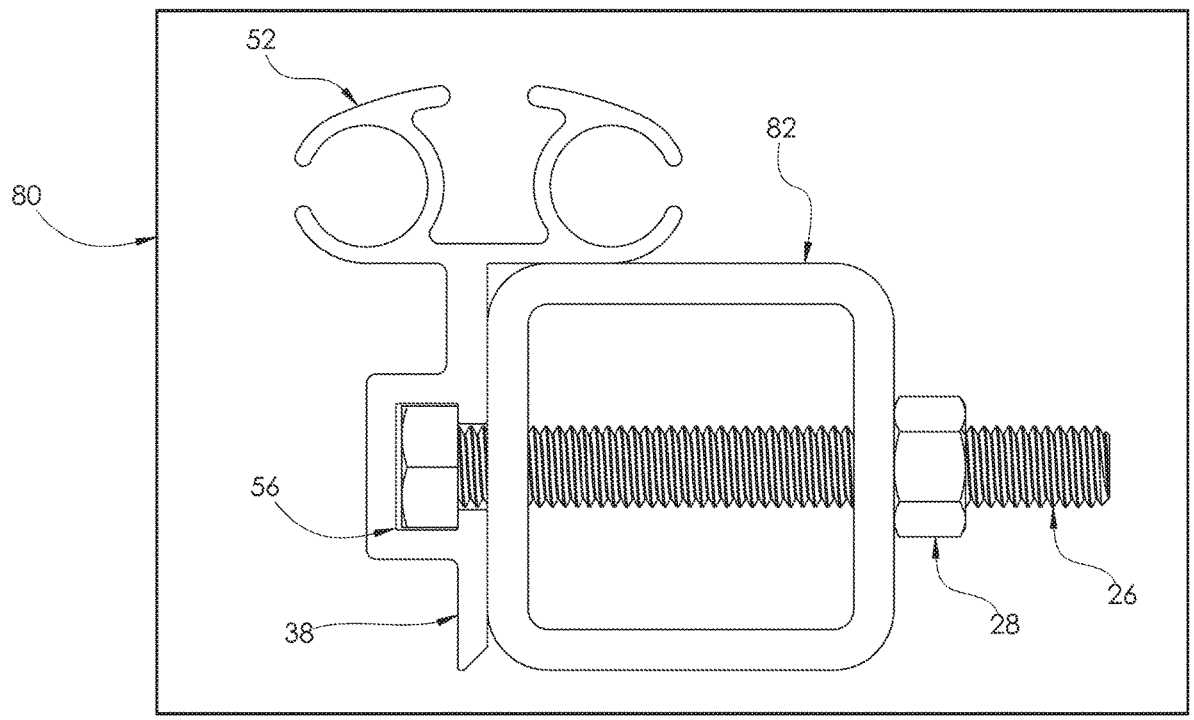
FIG. 6 depicts a section view of still another embodiment of the fabric attachment system of the present technology as it may be applied to a square sectional element.

With reference to FIG. 6, still another embodiment of the fabric panel attachment system of the present technology is depicted. In particular, a fabric attachment system 80 is secured to a square sectional element without a support 16 extending from the structural profile 82. In such embodiments, a mounting arm 38 extends from the keder rail 52 and attaches to structural profile 82 directly, without a support structure 16 as was presented in previous embodiments of the fabric panel attachment system. A bolt 26 and nut 28 can be coupled with a fastening channel 56 within the mounting arm 38 and used to fasten the mounting arm 38 and structural profile 82 with one another. While fabric panels and states of staging versus final position are not illustrated here, those concepts and progressions previously discussed similarly apply to this embodiment.

It is contemplated that various modifications can be made to the disclosed embodiments without departing from the scope of the present technology. For example, variations in the overall keder profile may be presented to accommodate attachment to structural profiles of various shapes. Moreover, the methods of attaching the fabric panel attachment system are not limited to a specific structural shape. Nor is the shape of a flat bar intended to be limiting as various shapes could fulfill the intended spirit of such an element. The shape and orientation of the elongated slots in a keder rail profile can also be modified or moved relative to the profile without departing from the spirit of the disclosed invention. The hardware used to fix the keder rail profile can also vary depending on costs and other considerations. Various hardware types are readily available for fastening to T-shaped slots in the industry; those hardware types are contemplated herein.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for attaching fabric panels to a structure, the system comprising:
    a support fixed to a structural profile associated with the structure, wherein the support extends transversely from a surface of the structural profile;
    a first keder rail including at least one elongated keder channel and a first mounting arm, wherein the first mounting arm comprises a mounting face adapted to operatively engage the support, the first mounting arm further comprising at least one mounting aperture that penetrates the mounting face;
    one or more fasteners sized to extend through the at least one mounting aperture and the support to secure the first mounting arm and the structural profile with one another, whereby the one or more fasteners are selectively adjustable in a manner that draws the first mounting arm and support toward one another from a slackened position, whereby the first mounting arm and support are spaced-apart from one another, to a tensioned position, whereby the first mounting arm and support are positioned against one another;
    a second keder rail comprising a second mounting arm;
    a first alignment channel operatively coupled with the first mounting arm, wherein the first alignment channel has an elongated opening in a side parallel to a length of the first keder rail;
    a second alignment channel operatively coupled with the second mounting arm, wherein the second alignment channel is open along its side; and
    an alignment element configured to be positioned in the first alignment channel and the second alignment channel to align the first keder rail with the second keder rail.

2. The system of claim 1 wherein:
    the first mounting arm is generally planar and extends transversely from a bottom surface of the first keder rail.

3. The system of claim 1 wherein:
the support is generally planar and the surface of the structural profile is an upper surface of the structural profile.

4. The system of claim 1 wherein:
a distal end portion of the first mounting arm is chamfered to provide a space between the first mounting arm and the support; the space being shaped to accommodate a weld bead or debris that may be located between the first mounting arm and the support.

5. The system of claim 1 further comprising:
a spacer that coaxially surrounds at least one of the one or more fasteners and prevents the first mounting arm and the support from advancing to the tensioned position with one another, maintaining the first mounting arm and support in a slackened position.

6. The system of claim 1 further comprising:
an elongated, depressed channel operatively coupled with the first mounting arm;
the depressed channel being in open communication with the at least one mounting aperture and shaped to receive a fastener element in a secure position that resists rotational movement of the fastener element.

7. The system of claim 6 wherein:
the one or more fasteners include threaded bolts, and the fastener element is a nut configured to threadably receive one of the threaded bolts.

8. The system of claim 1, further comprising an additional fastener positioned in the elongated opening of the first alignment channel.

9. The system of claim 1 wherein, in the tensioned position, heads of the one or more fasteners abut the support.

10. The system of claim 1, wherein the at least one elongated keder channel comprises two elongated keder channels.

11. A system for attaching fabric panels to a structure, the system comprising:
a support fixed to a structural profile associated with the structure, wherein the support extends transversely from a surface of the structural profile;
a keder rail including at least one elongated keder channel and a mounting arm, wherein the mounting arm comprises a mounting face adapted to operatively engage the support, the mounting arm further comprising at least one mounting aperture that penetrates the mounting face;
one or more fasteners sized to extend through the at least one mounting aperture and the support to secure the mounting arm and the structural profile with one another, whereby the one or more fasteners are selectively adjustable in a manner that draws the mounting arm and support toward one another from a slackened position, whereby the mounting arm and support are spaced-apart from one another, to a tensioned position, whereby the mounting arm and support are positioned against one another; and
a depressed channel operatively coupled with the mounting arm, wherein the depressed channel is elongated along an axis parallel to the keder channel, the depressed channel is in open communication with the at least one mounting aperture, and the depressed channel is shaped to receive a fastener element in a secure position that resists rotational movement of the fastener element.

12. The system of claim 11, wherein the at least one elongated keder channel comprises two elongated keder channels.

13. A system for attaching fabric panels to a structure, the system comprising:
a support fixed to a structural profile associated with the structure, wherein the support extends transversely from a surface of the structural profile;
a keder rail including two elongated keder channels and a mounting arm, wherein the mounting arm comprises a mounting face adapted to operatively engage the support, the mounting arm further comprising at least one mounting aperture that penetrates the mounting face;
one or more fasteners sized to extend through the at least one mounting aperture and the support to secure the mounting arm and the structural profile with one another, whereby the one or more fasteners are selectively adjustable in a manner that draws the mounting arm and support toward one another from a slackened position, whereby the mounting arm and support are spaced-apart from one another, to a tensioned position, whereby the mounting arm and support are positioned against one another.

* * * * *